United States Patent [19]
Povey

[11] 3,842,344
[45] Oct. 15, 1974

[54] BRIDGE CIRCUIT FOR MEASURING DIELECTRIC PROPERTIES OF INSULATION

[75] Inventor: Edmund H. Povey, Medford, Mass.

[73] Assignee: Doble Engineering Company, Belmont, Mass.

[22] Filed: Jan. 10, 1974

[21] Appl. No.: 432,192

[52] U.S. Cl. .............................. 324/54, 324/60 C
[51] Int. Cl. ...................... G01r 27/26, G01r 31/14
[58] Field of Search .................. 324/54, 60 R, 60 C

[56] References Cited
UNITED STATES PATENTS

| | | | |
|---|---|---|---|
| 2,170,813 | 8/1939 | Doble et al. | 324/54 |
| 2,329,098 | 9/1943 | Browning et al. | 324/54 |
| 2,923,879 | 2/1960 | Povey | 325/54 |
| 2,948,849 | 8/1960 | Foster | 324/54 |
| 3,015,774 | 1/1962 | Eigen | 324/54 |
| 3,211,998 | 10/1965 | Kidwell | 324/54 |
| 3,439,265 | 4/1969 | Strom | 324/54 |
| 3,710,242 | 1/1973 | Povey | 324/54 |
| 3,742,349 | 6/1973 | Richardson | 324/54 |
| 3,766,469 | 10/1973 | Nakane | 324/60 C |

Primary Examiner—Gerard R. Strecker

[57] ABSTRACT

A precision bridge for measuring the dielectric properties, such as capacitance and power factor, of an electrically insulating specimen. The standard branch comprises a high voltage resistor in series with a phase balancing network consisting of a variable capacitor and voltage follower shunted across a fixed resistor, and with the primary of a mutual inductor. The secondary of the mutual inductor provides a voltage which is in quadrature with the in-phase current through the high-voltage resistor, except for any phase shift introduced by the phase balancing network. The quadrature voltage excites a current source circuit to produce a quadrature current which is adjustable in magnitude by a variable resistor. This quadrature current energizes a first winding in a ratio transformer. The current in the specimen branch energizes a second winding in the ratio transformer, opposing the magnetic action of the first winding. A third winding responsive to the difference in the magnetic actions of the two opposing windings is connected to a detector. When the bridge is balanced as shown by a null reading of the detector, the power factor of the specimen is derived from the setting of the variable capacitor in the phase balancing circuit, and the capacitance of the specimen is derived from the setting of the variable resistor in the current source circuit and from the ratio of turns in the first and second transformer windings.

14 Claims, 1 Drawing Figure

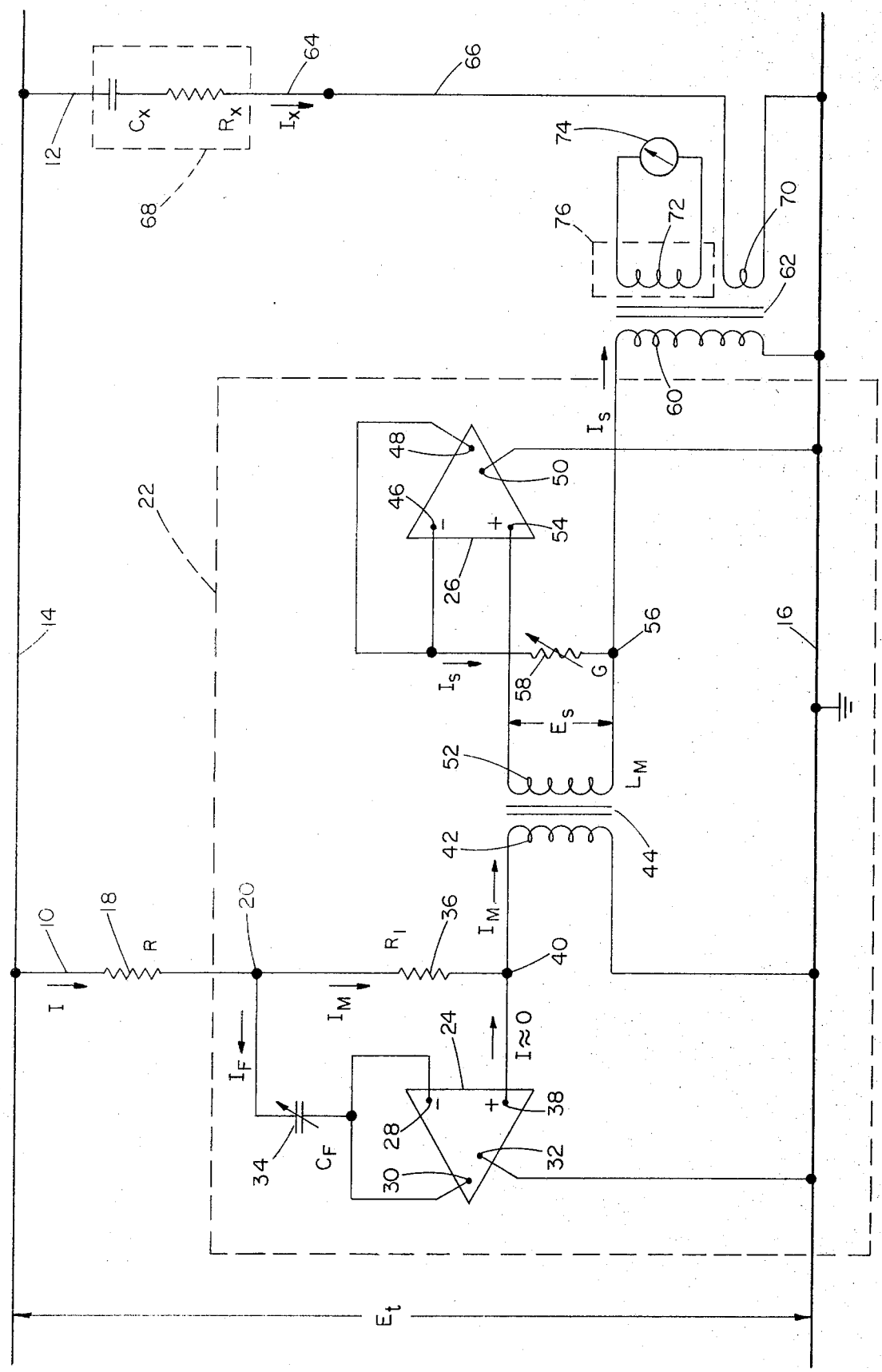

BRIDGE CIRCUIT FOR MEASURING DIELECTRIC PROPERTIES OF INSULATION

SUMMARY OF THE INVENTION

This invention relates to bridge circuit apparatus for measuring electrical characteristics of materials and more particularly to a transformer ratio arm bridge having a high degree of sensitivity combined with simplicity of operation and being especially well adapted for measuring the capacitance and power factor of insulation at high voltages, for example, in the range from 10kV to 100kV, although not being limited to this range.

In electrical power systems it is well known that the insulation of apparatus deteriorates because of such factors as exposure to the elements, high operating temperatures, ionization and the effects of surge and lightning strokes. This deterioration is evidenced by a more or less continuous change in the capacitance of the insulation and an increase in the power factor. By making periodic electrical measurements, particularly of the power factor, the condition of the insulation may be monitored. Impending failures of the insulation may thereby be anticipated, permitting removal of the component before complete failure occurs. Because of the present improved quality of insulation, precision measurements with highly sensitive measuring devices, such as bridges, have been found necessary for detecting the small changes that may indicate impending failure. In general, the measurements must be made while the electrical equipment is in operating position, and this requires that the measuring device be adapted to operate under field conditions.

A type of bridge which has particular advantages for the field measurement of insulation characteristics is the transformer ratio arm bridge. Heretofore, in the embodiments of this type of bridge the test voltage is applied to both the test specimen and to a standard capacitor. The resulting specimen current is passed through a first (specimen) winding of a ratio-arm transformer tending to produce a magnetomotive force acting on the transformer core. The current from the standard capacitor is passed through a second (standard) winding of the transformer, but in such direction that the magnetomotive force opposes that produced by the first winding. A third winding is provided in the tranformer for connection of a detector to indicate, by a null reading, when the two magnetomotive forces are equal and cancel each other.

At balance, the following relation exits:

$$C_r = C_s N_s / N_r$$

where $C_r$ and $C_x$ are the capacitances of the specimen and standard capacitor, and $N_s$ and $N_r$ the number of turns in the standard and specimen windings respectively. Balance requires that either $C_s$, $N_s$ or $N_r$ be adjustable. For high-voltage work, a variable standard capacitor is impractical, so that balance has been achieved by varying the number of active turns in the specimen or standard windings. For this purpose, and to obtain good resultion, the transformer windings are constructed with many turns and with a multiplicity of taps, making for a complicated and expensive construction.

Furthermore to achieve exact balance and to obtain a measurement of the dielectric characteristic of the specimen, e.g, power factor, some calibrated adjustment must be provided to bring the currents in the specimen and standard windings of the transformer in phase with each other. Circuits for performing this function have been used which are subject to measurement error. It is therefore an object of this invention to provide a novel and improved apparatus which overcomes these several disadvantages. In a particular embodiment, the high voltage element in the standard arm is a fixed high voltage resistor, which is simple, more rugged and less expensive than the usual high voltage capacitor. The resistor is used in conjunction with other low voltage circuit elements to provide a variable standard current equivalent to that which might be supplied by a variable high voltage standard capacitor. This also permits the elimination or substantial reduction in the number of taps required in the ratio transformer windings. It is also an object of this invention to provide a simple and accurate method for measuring the dielectric loss characteristic of an insulation specimen adaptable to a transformer ratio arm bridge.

According to the aspects of the invention, there is provided a bridge circuit which has a standard branch that includes a standard high-voltage resistor in conjunction with a mutual inductor and a current source circuit that is arranged to produce a current simulating that which would flow through a standard high-voltage capacitor connected in said standard branch in place of said standard resistor, mutual inductor, and current source. The current source in a particular embodiment utilizes an operational amplifier connected as a voltage follower together with a variable resistor to permit variation of the output current of the current source without significantly affecting the current through the standard branch. Also included in the standard branch of that embodiment is a phase balancing circuit consisting of a second operational amplifier connected as a follower together with a variable capacitor and a fixed resistor to permit variation of the phase of the output current of the current source as a simple function of the value of the variable capacitor. The two operational amplifier arrangement permits measurement of the capacitance and power factor of a test specimen using the values of the variable capacitor and the variable resistor in a particularly simple way.

An advantage of the invention is that the output current in the standard branch can be controlled finely by a simple adjustable resistor. It is a consequent advantage that the number of taps required in the winding of a current ratio transformer is reduced, making the bridge easier and more economical to construct.

Another advantage of the transformer ratio arm bridge is that the arm across the measuring element at balance is practically zero. The bridge is therefore less sensitive to impedances that may appear across the measuring element when measuring one section of a complex insulation structure. Also because of this no guard balancing networks are required as with many other types of bridge.

Other objects, features, and advantages of this invention will be seen from the following detailed description of a particular embodiment thereof in conjunction with the accompanying drawing in which the single FIGURE is a schematic diagram of a transformer ratio arm bridge in accordance with the principles of this invention.

DESCRIPTION OF PARTICULAR EMBODIMENT

In the drawing, the bridge includes standard branch 10 and specimen branch 12, each being connected between high voltage conductor 14 and ground 16, the potential above ground of conductor 14 being $E_t$ volts. Standard branch 10 consists of resistor 18 whose resistance is R ohms and network 22, and supplies a current to transformer winding 60.

Within electrical network 22 are operational amplifiers 24 and 26 (for example, Analogue Device, Inc., Model 118), the input terminals of which draw no significant current. Each amplifier is connected as a follower and acts on the external circuit to maintain its negative (−) input terminal at the same potential as its positive (+) terminal by furnishing the necessary current from the power supply via its output terminal.

Negative terminal 28 and output terminal 30 of ampliaifer 24 are connected together in feedback relation, and power supply common terminal 32 is connected to ground 16. Adjustable capacitor 34, of capacitance $C_F$, is connected between the feedback connection of terminals 28 and 30 and junction 20 of network 22. Fixed resistor 36 of $R_1$ ohms resistance is connected between network terminal 20 and positive terminal 38 of amplifier 24 at junction 40. The primary winding 42 of mutual inductor 44 is connected between junction 40 and ground 16.

Negative terminal 46 and output terminal 48 of operational amplifier 26 are connected together in feedback relation, and power supply common terminal 50 is connected to ground 16. The secondary winding 52 of mutual inductor 44 is connected between positive terminal 54 of amplifier 26 and junction 56. Variable resistor 58 of G ohms conductance is connected between junction 56 and the feedback connection of terminals 46 and 48. The standard winding 60 of current ratio transformer 62 is connected between junction 56 and ground 16.

The specimen branch 12 of the bridge comprises the two arms 64 and 66 connected in series between the high voltage conductor 14 and the ground 16. Arm 64 consists of test specimen 68 having an equivalent series capacitance $C_x$ and an equivalent series resistance $R_x$.

The arm 66 consists of a second winding 70 of current ratio transformer 62 having $N_x$ turns, connected into the circuit so that is ampere turns are in magnetic opposition to the ampere turns of winding 60. A third winding 72 is connected to detector 74 which responds to any unbalanced ampere turns of windings 60 and 70.

In order to obtain maximum sensitivity and precision, the core of ratio transformer 62 should have high initial permeability magnetic material and the coefficient of coupling among the three windings 60, 70, and 72 should be high. Further, in order to minimize any erroneous balance due to leakage flux from windings 60 and 70 linking detector winding 72, this last winding is shielded by enclosing it within a shield 76 of high permeability magnetic material.

A general explanation of the operation of the bridge is as follows:

Referring again to FIG. 1 the current I through resistor 18 is substantially in phase with the test voltage $E_t$. However, a quadrature component of current $I_F$ is generated by operational amplifier 24 as it maintains a potential across capacitor 34 equal to that across transistor 36. Current $I_F$ combines with current I to form the current $I_M$ which flows in the primary 42 of mutual inductor 44. The phase deviation produced by component $I_F$ can be calculated from resistor 36 and capacitor 34 without reference to the impedance of inductor winding 42. The current $I_M$ in the primary winding 42 produces a voltage $E_s$ across the secondary winding 52 in phase quadrature with current $I_M$. The voltage $E_s$ excites operational amplifier 26 to supply sufficient current through variable resistor 58 to produce a corresponding voltage drop. The current $I_s$ is in phase with $E_s$ and therefore in quadrature with current $I_M$; and its magnitude is controlled by the value of resistor 58. The net effect of the aforementioned elements (18, 24, 36, 44, 26 and 58) is to provide to transformer ratio winding 60 an essentially quadrature current $I_s$ which can be controlled in magnitude and in phase angle over a useful range. The current $I_s$ is independent of the impedance of winding 60 within the range of operation of amplifier 26. The current range of amplifier 26 may be increased by using a "current booster" in conjunction with the amplifier, a procedure well known in the art. Large extension of the range of the capacitance to be measured may make taps on the current ratio transformer windings desirable, however, smaller variations in the capacitance to be measured permit adjustment by a suitable variable resistor 58.

Current $I_s$ flows through the transformer ratio winding 60 to produce a magnetomotive force in the magnetic circuit of transformer 62 in opposition to the magnetomotive force produced by the current $I_x$ in ratio winding 70.

The bridge is balanced by successive alternate adjustments of resistor 58 and capacitor 34 to obtain the capacitive balance and the phase (power factor) balance.

An analysis of the operation of the bridge and the conditions of balance is as follows:

R is the resistance of the standard resistor 18.

(The resistance of resistor 36 and that of primary winding 42 within the network are also included in R, but since the value of R is almost always in the megohm range, these two other resistances may usually be neglected.)

$C_F$ is the capacitance of capacitor 34.
$I_F$ is the current in capacitor 34.
$C_x$ is the equivalent series capacitance of test specimen 68.
$R_x$ is the equivalent series resistance of test specimen 68.
$I_M$ is the current in resistor 36 and primary 42.
$R_1$ is the resistance of resistor 36.
$L_M$ is the mutual inductance of inductor 44.
$\omega = 2\pi f$ where f is the frequency in Hz.
G = conductance of resistor 58.
$N_s$ = number of turns in winding 60.
$N_x$ = number of turns in winding 70.
Referring to the FIGURE.

$$I_M = I - I_F \quad (1)$$

$$I \approx E_t/R \quad (2)$$

$$I_F = I_M R_1 (j\omega C_F) \tag{2}$$

Substituting (2) and (3) in (1) $I_M = I - I_F = E_t/R - (jI_M R_1 \omega C_F)$ $$I_M (1+jR_1\omega C_F) = E_t/R \tag{4}$$

$$\begin{aligned}I_M &= E_t/R(1+jR_1\omega C_f) = (E_T/R(1+jR_1\omega C_F)) \\ &\quad (1-jR_1\omega C_F/1-jR_1\omega C_F) \; I_M = \\ &\quad E_t(1-jR_1\omega C_F)/R[1+(R_1\omega C_F)^2]\end{aligned} \tag{5}$$

$$E_s = jI_m \omega L_M \tag{6}$$

$$\begin{aligned}I_s &= E_s G = jI_M \omega L_M G = jE_t G\omega L_M (1-jR_1\omega C_F)/R[+(R_1\omega C_F)^2] = \\ &\quad E_t G\omega L_M (R_1\omega C_F + j)/R[1+(R_1\omega C_F)^2]\end{aligned} \tag{7}$$

$$\begin{aligned}I_x &= E_t/R_x - j1/\omega C_x = (E_t\omega C_x)/R_x\omega C_x - j \\ &\quad (R_x\omega C_x + j)/R_x\omega C_x + j\end{aligned}$$

$$I_x = E_t(R_x\omega^2 C_x^2 + j\omega C_x)/1+(R_x\omega C_x)^2 \tag{8}$$

At the balance, the defect angle $\delta$, or (tan $\delta$) must be the same for both $I_s$ and $I_x$.

From (7) and (8) $R_1\omega C_F/1 = R_x\omega^2 C_x^2/\omega C_x = R_x\omega C_x/1$ \hfill (9)

$$\tan \delta = R_1\omega C_F = R_x\omega C_x \tag{10}$$

At balance, $$N_s I_s = N_x I_x$$

For capacitance balance, only the $j$ terms are involved.

From (7) and (8)

$N_s E_t G\omega L_M/R[1+(R_1\omega C_F)^2] = N_x E_t\omega C_x/[1+(R_x\omega C_x)^2]$ From (9) the terms in the brackets are equal. $C_x = G\omega L_M/R \; N_s/N_x$ \hfill (11)

$R_x$ may be determined from (9).

$$R_x = R_1(C_F)/(C_x) \tag{12}$$

The principles of the invention are not restricted to any specific values of the elements of the bridge such as resistors, inductors, capacitors and amplifiers, but rather are based on the correlation of such elements to adapt the bridge to the measurements of the electrical properties of electrical insulation under the manifold conditions of voltage, frequency and location.

As an example, it was found that the following values of parameters and ratings were well adapted to the testing of 10 kV capacitors in the 0.005 to 0.05 $\mu f$ range suitable for use in power systems.

$R = 0.5$ megohm
$R_1 = 1$ kilo-ohm
$C_F = (0 - 0.25)$ microfarad
$L_M = 0.05$ Henry (mutual inductance)
$G = 0$–10,000 micromhos
Winding 60 – 100 turns
Winding 70 – 100 turns
Winding 72 – one turn
Detector 74 – GR type 1232 A While a particular embodiment of the invention has been shown and described, various modifications thereof will be apparent to those skilled in the art and therefore it is not intended that the invention be limited to the disclosed embodiment or to details thereof, the departures may be made therefrom within he spirit and scope of the invention.

I claim:

1. Apparatus to be used in conjunction with a source of alternating test voltage for measuring the capacitance and power factor of a test specimen, said apparatus comprising:

a standard resistor, a mutual inductor having first and second windings, said first winding being connected in series with said standard resistor such that the current through said first winding, resulting from application of said test voltage to said apparatus, is substantially determined by said standard resistor and is in phase with said test voltage, said mutual inductor constructed such that the voltage induced in said second winding is substantially in quadrature phase relation with said test voltage, a current source responsive to the voltage induced in the second winding of said mutual inductor, which produces an output current substantially in phase with said induced voltage, means for controlling the magnitude of the current output of said current source with no significant effect on the current in the first winding of said mutual inductor, terminal means for connecting said test specimen across said source of test voltage, and detection means responsive to the difference in phase and magnitude between the output current of said current source and that of the current through said specimen resulting when said specimen is connected to said terminal means with said test voltage applied.

2. Apparatus as claimed in claim 1 wherein said detection means is comprised of a transformer having two windings of known turns ratio plus a third winding, the first winding of said transformer, when connected in series with the test specimen across the source of test voltage, producing a magnetomotive force depending on the specimen current and the number of turns in said first winding, the second winding connected to said current source and producing an opposing magnetomotive force depending upon the output current of said current source and the number of turns in said second winding, and the third winding connected to an indicating device sensitive to any imbalance in the magnetomotive forces produced by the first and second windings.

3. Apparatus as claimed in claim 1 wherein said current source includes an operational amplifier connected to act as a voltage follower, said operational amplifier having two input terminals drawing no significant current and having an output current determined by the voltage induced in the second winding of said mutual inductor.

4. Apparatus as claimed in claim 3 wherein said means for controlling the magnitude of the current output of said current source is a variable resistor connected between the output of said operational amplifier and said detection means.

5. Apparatus as claimed in claim 1 further including means for controlling the phase relation of the current flowing through the first winding of said mutual inductor as a result of application of said test voltage, said means being connected in shunt across the first winding of said mutual inductor.

6. Apparatus as claimed in claim 5 wherein said means for controlling the phase relation includes
  a fixed resistor connected in series with the first winding of said mutual inductor,
  a variable capacitor, and
  an operational amplifier connected as a follower to keep the voltage across said variable capacitor equal to the voltage across said fixed resistor, said variable capacitor and said operational amplifier connected in series as a shunt across aid fixed resistor and said first winding of the mutual inductor.

7. Apparatus to be used in conjunction with a source of alternating test voltage for measuring the capacitance and power factor of a test specimen, said apparatus comprising
  a standard resistor,
  a mutual inductor having first and second windings, said first winding being connected in series with said standard resistor such that the current through said first winding, resulting from application of said test voltage to said apparatus, is substantially determined by said standard resistor, said mutual inductor constructed such that the voltage induced in such second winding is substantially in quadrature phase relation with said test voltage,
  means for controlling the phase relation of the current flowing through the first winding of said mutual inductor as a result of application of said test voltage, said means being connected in shunt across the first winding of said mutual inductor,
  terminal means for connecting said test specimen across said source of test voltage, and
  detection means responsive to the difference in phase and magnitude between the output current of said current source and that of the current through said specimen resulting when said specimen is connected to said terminal means with said test voltage applied.

8. Apparatus as claimed in claim 7 wherein said means for controlling the phase relation includes
  a fixed resistor connected in series with the first winding of said mutual inductor,
  a variable capacitor, and
  an operational amplifier connected as a follower to keep the voltage across said variable capacitor equal to the voltage across said fixed resistor, said variable capacitor and said operational amplifier connected in series as a shunt across said fixed resistor and said first winding of the mutual inductor.

9. Apparatus as claimed in claim 7 further including a current source responsive to the voltage induced in the second winding of said mutual inductor, which produces an output current substantially in phase with said induced voltage.

10. Apparatus as claimed in claim 9 wherein said current source includes an operational amplifier connected to act as a voltage follower, said operational amplifier having two input terminals drawing no significant current and having an output current determined by the voltage induced in the second winding of said mutual inductor.

11. Apparatus as claimed in claim 10 wherein said current source is further comprised of a variable resistor connected in series with the output of said operational amplifier.

12. Apparatus as claimed in claim 5 wherein said detection means is comprised of
  a transformer having two windings of known turns ratio plus a third winding, the first winding of said transformer, when connected in series with the test specimen across the source of test voltage, producing a magnetomotive force depending on the specimen current and the number of turns of said first winding, the second winding connected to said current source producing an opposing magnetomotive force depending upon the output current of said current source and the number of turns in said second winding, and the third winding connected to an indicating device sensitive to any imbalance in the magnetomotive forces produced by the first and second windings.

13. Apparatus as claimed in claim 11 wherein said means for controlling the phase relation includes
  a fixed resistor connected in series with the first winding of said mutual inductor,
  a variable capacitor, and
  an operational amplifier connected as a follower to keep the voltage across said variable capacitor equal to the voltage across said fixed resistor, said variable capacitor and said operational amplifier connected in series as a shunt across said fixed resistor and said first winding of the mutual inductor.

14. Apparatus as claimed in claim 13 wherein said detection means includes
  a transformer having two windings of known turns ratio plus a third winding, the first winding of said transformer, when connected in series with the test specimen across the source of test voltage, producing a magnetomotive force depending on the specimen current and the number of turns in said first winding, the second winding connected to said current source producing an opposing magnetomotive force depending upon the output current of said current source and the number of turns in said second winding, and the third winding connected to a device sensitive to any imbalance is the magnetomotive forces produced by the first and second windings.

* * * * *

UNITED STATES PATENT OFFICE
CERTIFICATE OF CORRECTION

Patent No. 3,842,344  Dated October 15, 1974

Inventor(s) Edmund H. Povey

It is certified that error appears in the above-identified patent and that said Letters Patent are hereby corrected as shown below:

Column 2, line 54, "arm" should be --voltage--.

Column 3, line 18, "ampliaifer" should be --amplifier--.

Column 4, line 1, "transistor" should be --resistor--.

Column 5, equation "(2)" should be --(3)--;

Column 5, equation "(7)" should read:

$$I_s = E_s G = jI_M \omega L_M G$$
$$= j\frac{E_t G \omega L_M (1-jR_1\omega C_F)}{R[1+(R_1\omega C_F)^2]}$$
$$= \frac{E_t G \omega L_M (R_1\omega C_F + j)}{R[1+(R_1\omega C_F)^2]}$$

Column 6, line 4, insert a space between "invention" and "has".

Column 7, line 18, "aid" should be --said--.

Signed and sealed this 31st day of December 1974.

(SEAL)
Attest:

McCOY M. GIBSON JR.  C. MARSHALL DANN
Attesting Officer  Commissioner of Patents